Feb. 25, 1930.   M. E. COGSWELL   1,748,755
WINDSHIELD WIPER
Filed June 2, 1928
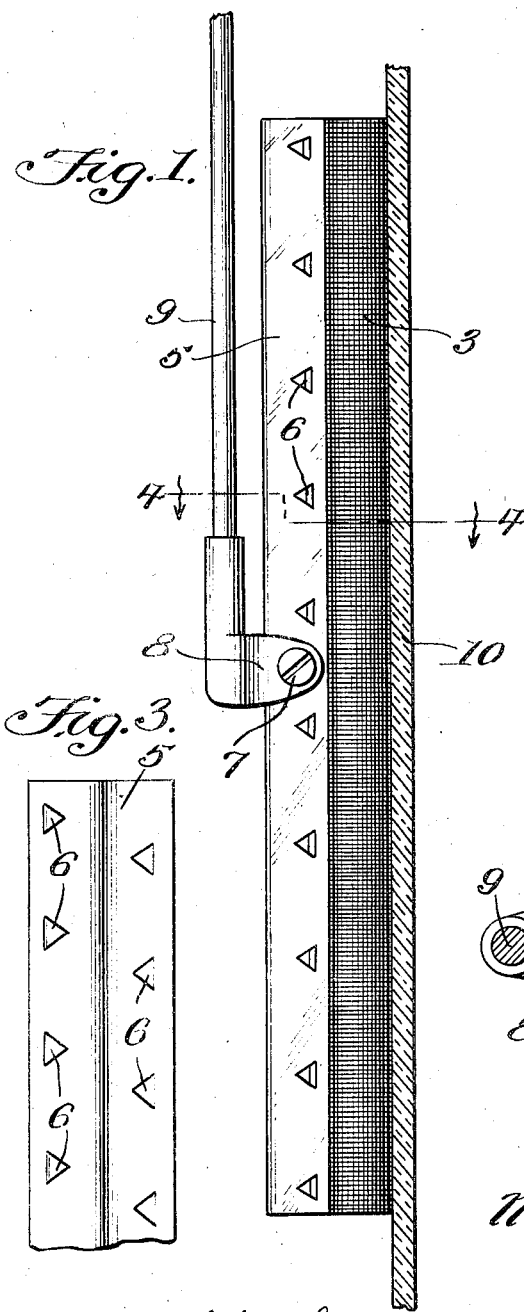
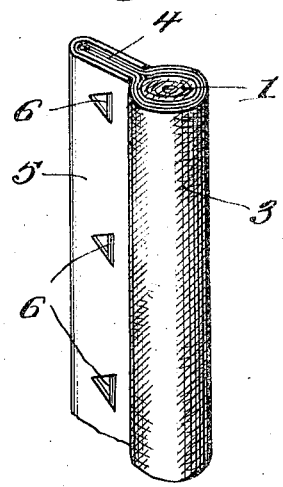
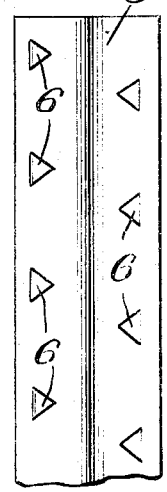
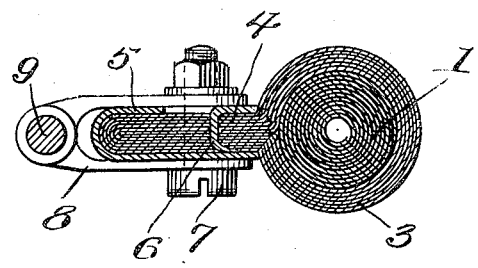
Mark E. Cogswell
INVENTOR
BY Victor J. Evans
ATTORNEY
WITNESS J. T. L. Wright Patented Feb. 25, 1930

1,748,755

UNITED STATES PATENT OFFICE

MARK ELBERT COGSWELL, OF WOLSEY, SOUTH DAKOTA

WINDSHIELD WIPER

Application filed June 2, 1928. Serial No. 282,402.

My present invention has reference to a windshield wiper of a type and construction designed for use in winter weather for preventing the accumulation of frost, ice, rain or mist upon the windshield.

A further object is the provision of a windshield wiper whose body portion is constructed of fabric, wound upon itself to provide an inner core and an outer wiping surface both the core and the wiping surface comprising wound sheets of gauze, the wiping surface having its end secured between the sides of a substantially U-shaped metal member which is removably connected with the operating arm of the usual rubber and squeegee wiper, the fabric wiping surface of the improvement designed to be impregnated with a non-freezing and non-dropping fluid which is delivered therefrom onto the windshield and which will prevent the accumulation of frost, ice, water or mist upon the windshield so that the driver, in winter weather, will have an unobstructed view through the windshield.

To the attainment of the foregoing the invention consists in the improvement as hereinafter described and definitely claimed.

In the drawings:

Figure 1 is a side elevation of my improvement the windshield glass being in section.

Figure 2 is a detail perspective view of the improvement.

Figure 3 is a plan view of a metal holder member of the wiper prior to the bending thereof.

Figure 4 is an enlarged sectional view approximately on the line 4—4 of Figure 1.

My improvement includes an inner cross sectionally rounded portion or core 1. This core is preferably of loose woven thin fabric commonly known as gauze and the sheet that comprises the core is tightly wound upon itself. The wiping surface 3 also is in the nature of a strip of gauze and is wound around the core. The wiping surface 3 is comparatively loosely wound, so that the same is yieldable, and the edges of the wound wiping surface 3 which extend laterally therefrom and which are indicated for distinction by the numeral 4, are received between the parallel sides of a metal plate 5. The plate is centrally bent upon itself and has its sides, at spaced intervals, formed with V-shaped slits and the metal bounded by these slits is bent inwardly and forced through the part 4 of the facing 3, the pointed ends of the prongs thus provided, which are indicated by the numeral 6, contacting with the inner faces of the respective sides of the metal holder and, by pressure, are bent thereagainst, as clearly disclosed by Figure 4 of the drawings. The cross sectionally U-shaped metal holder 5 is approximately centrally provided with a round opening through which passes a bolt member 7 engaged by the usual nut, the said bolt member also passing through the bifurcated lower end 8 of the operating rod 9 for the ordinary windshield wiper. It will be apparent that when the nut is screwed home upon the bolt member 7 the arms provided by the bifurcated lower end 8 of the operating rod 9 will be forced toward each other and consequently into tight frictional engagement with the opposite sides of the centrally bent or rounded plate 5, with the result that the prongs 6, adjacent to the said bolt will have their ends bent against the inner face of the non-apertured side of the wiper holder element.

The compressible wiping surface 3 of the improvement is designed to be impregnated with pure glycerine which is both a non-freezing and non-dropping fluid and the device is oscillated or moved in the usual manner by the actuation of the rod 9 over the outer face of the windshield 10. The glycerine squeezed through the wiper onto the windshield will create a thin film which does not interfere with the vision of the driver of the automobile but which will repel any accumulation of frost, snow, water or mist. Frost, snow and ice can not be readily removed by the usual rubber squeegee of the ordinary windshield wipers and as my improvement is designed for use only in frosty or wintry weather the same can be readily removed from the rod 9 and be replaced by the usual rubber squeegee during moderate weather.

While I have herein illustrated a satisfactory embodiment of the improvement my features of invention are capable of extended application and I do not wish to be limited to the specific structure shown and described.

Having described the invention, I claim:

A windshield wiper comprising a core of wound gauze and an outer facing which is also of wound gauze and which has an extended portion and a U-shaped holder receiving the extended portion of the outer gauze, and having prongs securing the said extended portion.

In testimony whereof I affix my signature.

MARK ELBERT COGSWELL.